Patented Feb. 13, 1951

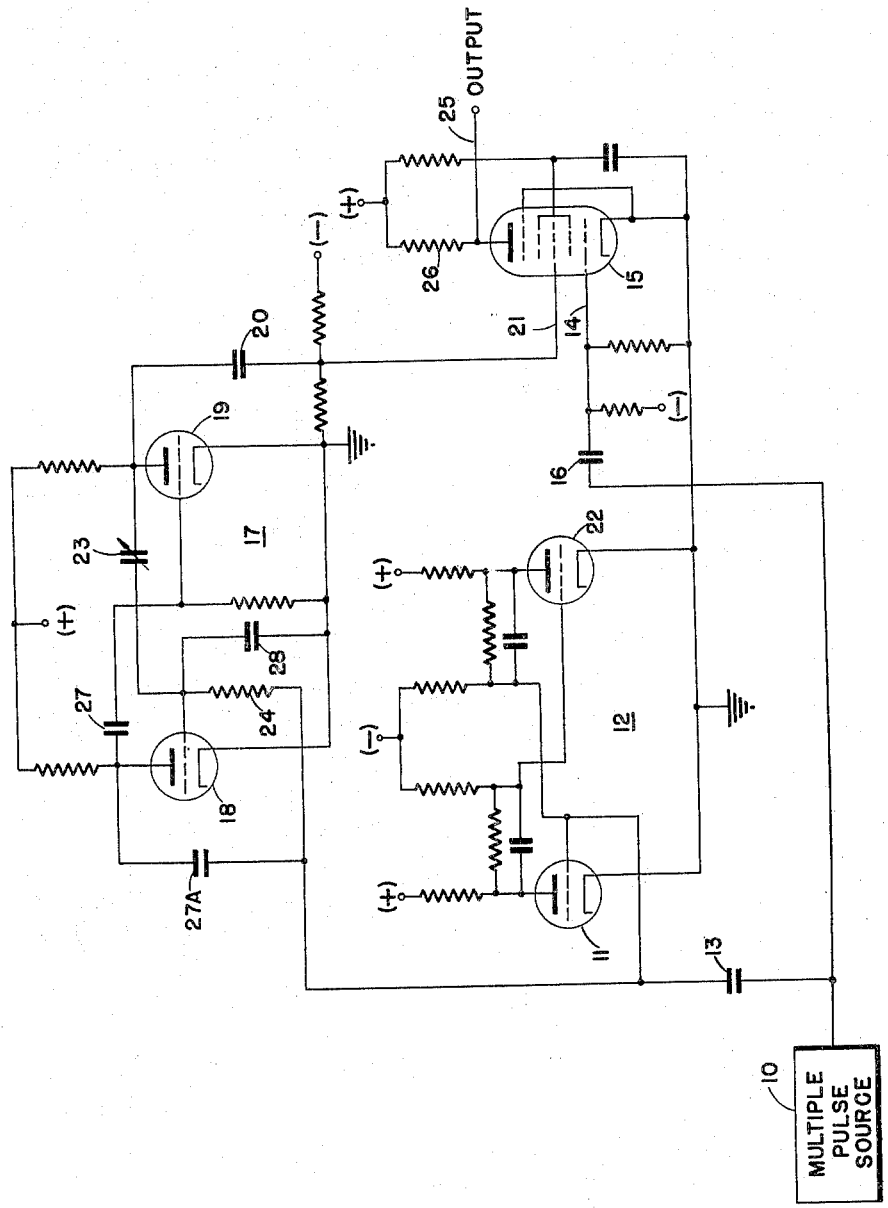

2,541,038

UNITED STATES PATENT OFFICE 2,541,038

PULSE DISCRIMINATOR SYSTEM

Claud E. Cleeton, Washington, D. C.

Application December 10, 1945, Serial No. 634,128

5 Claims. (Cl. 250—27)

(Granted under the act of March 3, 1883, as amended April 30, 1928; 370 O. G. 757)

This invention relates to discriminator circuits for delivering an output signal upon the application thereto of a pulse type signal having a certain characteristic. Specifically, the invention relates to pulse spacing discriminator systems wherein an output signal is delivered only upon the application thereto of a multiple pulse type signal wherein one pulse is separated from a subsequent pulse by predetermined time intervals.

In radio and the allied art, interference between two or more signal sources is frequently encountered. This interference may be minimized by imparting a special transmission characteristic to the signal emitted by the desired signal source and providing certain selective characteristics in the receiving system so that the receiving system is held solely responsive to the special transmission characteristic emitted by the desired signal source.

One special characteristic applicable in pulse type transmission is the emission of energy in the form of pulse groups, each group containing several pulses. Thus the spacing between the pulses of each group can be accurately timed and such time interval made the basis of selection for delivery of output signals. In the reception of such a pulse signal, a special mechanism in the receiving unit is therefore required which is capable of rejecting single pulse signals or multiple pulse signals having a time spacing other than the desired amount.

It is therefore an object of this invention to provide a selector system responsive to multiple pulse signals in which the time interval between the first pulse of one signal group and a subsequent pulse of the same group is of a predetermined duration.

Another object of the present invention is to provide a selector system which will deliver an output signal only upon the application to it of a pulse signal occurring a predetermined period of time after a previous pulse signal.

Another object of the present invention is to provide a pulse spacing discriminator in which the selective responding period may be adjustable as desired.

Other objects and features of the present invention will become apparent upon a careful consideration of the accompanying drawing and detailed description.

In the drawings:

The single figure of the drawing is a schematic diagram, partly in block, illustrating the features of the present invention.

With reference now to the single figure of the drawing, dual positive pulse signals from the pulse source 10 are applied to the grid of tube 11 of a first trigger circuit 12 through capacitance 13 and to grid 14 of a multiple grid coincidence tube 15 through capacitance 16.

A second trigger circuit 17 of the free running multivibrator type comprises two electron tubes 18, 19. The grid of tube 18 is direct connected to the grid of tube 11 of the first trigger circuit 12. By this connection tube 18 is held in a non-conducting condition whenever tube 11 is non-conductive. The plate of tube 19 is coupled through capacitance 20 to a second control element 21 of the multiple grid coincidence tube 15. Coincidence tube 15 is shown as of the multiple grid type, such as a 6SA7, in which sufficient negative bias is maintained at both control grids 14, 21, by means of voltage dividers from a negative supply so that either grid, alone, will prevent flow of plate current in the tube.

Trigger circuit 12 comprising tubes 11 and 22 is of a type possessing two stable conductivity states. In response to the leading edge of the first pulse of the multiple pulse signal, tube 11 which was previously in a non-conductive condition, is rendered conductive. The resulting drop in potential at the plate of tube 11 is communicated to the grid of tube 22 stopping conduction by the latter tube. Upon cessation of conduction by tube 22, the grid of tube 11 is raised to a condition of near zero bias. Under this condition, the grid of tube 18 begins an exponential rise in potential as the coupling capacitance 23 discharges through resistance 24. Eventually a bias point is reached at which tube 18 is brought to conduction. The resulting drop in potential at the plate of tube 18, communicated to the grid of 19, interrupts the flow of plate current through tube 19 and produces a rising positive potential at the plate thereof. The rising positive voltage removes the cut off bias maintained at grid 21 of tube 15 so that conduction by tube 15 is possible upon simultaneous occurrence of the positive leading edge of the second pulse from source 10. Upon conduction by tube 15, a single negative pulse appears at the output terminal 25 as a result of the voltage drop across resistance 26. Subsequent to the above action, the coupling capacitance 27 connecting the plate of tube 18 and the grid of tube 19 discharges sufficiently to permit tube 19 to conduct. As this occurs, tube 18 is cut off and a reverse action of the trigger circuit 12 is initiated and aided by capacitance 27A returning the trigger circuit 12 to the conduction condition which existed prior to the application of the pulse signal in which tube 22 is conductive. Under this condition the trigger circuit 17 is held inoperative by the trigger circuit 12 and the device is capable of responding to a second series or group of two pulses.

Since the selective responding time of the device is established by the period required to raise tube 18 to a conducting condition, some means for the adjustment of this period is necessary. To this end, the coupling capacitance 23 between the grid of tube 18 and the plate of tube 19 is made variable, and a capacitance 28 is connected between the grid of tube 18 and ground.

For more positive triggering action of tube 15 it is desirable to have the coupling circuits associated with capacitances 16 and 20 of the short time-constant variety to produce differentiated triggering signals.

The invention described herein may be manufactured and used by or for the Government of the United States of America for governmental purposes without the payment of any royalties thereon or therefor.

What I claim is:

1. A pulse signal discriminator for delivering an output signal whenever two pulses of a multiple pulse signal group occur with a desired time spacing, comprising; signal generating means responsive to a first pulse of said pulse signal group for producing a signal time delayed with respect to said first pulse, and a biased electron tube coincidence system for producing an output signal whenever said time delay signal and a second signal of the input pulse signal group occur in time coincidence.

2. A pulse signal discriminator for delivering an output signal whenever two pulses of a multiple pulse signal group occur with a desired time spacing, comprising; means responsive to a first input pulse signal for initiating a progressively varying waveform, electron tube means biased to change conductivity conditions when said progressively varying waveform reaches a predetermined value after a predetermined duration of changing time, means producing a pulse type signal in time coincidence with the change in conductivity conditions of said electron tube means, and a biased electron tube device for producing an output signal when said pulse type signal occurs in time coincidence with a second input pulse signal.

3. A method of identifying pulse signal groups consisting of a plurality of pulses spaced apart a predetermined period of time, comprising; producing in response to a first input pulse, a voltage signal progressively varying with the passage of time, producing a pulse type timing signal when this changing voltage signal reaches a predetermined amplitude, and producing an output signal when the pulse type timing signal occurs in time coincidence with a second input signal.

4. A pulse group discriminator for delivering an output signal whenever two pulses of a multiple pulse signal group occur with a desired time spacing, comprising; first and second trigger circuits each having two conductive conditions, coupling means initiating a first conductive condition in the first trigger circuit in response to a first pulse of the input signal, resistance-capacitance integrating coupling means interconnecting the first and second trigger circuits initiating a first conductive condition in the second trigger circuit a predetermined time interval after the first pulse signal, means changing said first and second trigger circuits to a second conductive condition a predetermined time interval after the first pulse signal, and coincidence means producing an output signal when the initiation of the first conductive condition in the second trigger circuit occurs in time coincidence with a second input pulse.

5. A pulse group discriminator for delivering an output signal whenever two pulses of a multiple pulse signal group occur with a desired time spacing, comprising; first and second trigger circuits each having two conductive conditions, coupling means initiating a first conductive condition in the first trigger circuit in response to a first pulse of the input signal, resistance-capacitance integrating coupling means interconnecting the first and second trigger circuits initiating a first conductive condition in the second trigger circuit a predetermined time interval after the first pulse signal and producing thereby a pulse type timing signal, means changing said first and second trigger circuits to a second conductive condition a predetermined time interval after the first pulse signal, a coincidence system for producing large amplitude output signals upon simultaneous application thereto of two pulse signals of selected polarity and amplitude, and differentiating coupling means applying the aforementioned pulse type timing signal and the input pulse signal to said coincidence system.

CLAUD E. CLEETON.

REFERENCES CITED

The following references are of record in the file of this patent:

UNITED STATES PATENTS

| Number | Name | Date |
|---|---|---|
| 2,412,974 | Deloraine | Dec. 24, 1946 |